United States Patent Office 3,507,877
Patented Apr. 21, 1970

3,507,877
ISOMERS OF INDOLO[2,3-a]QUINOLIZINE COMPOUNDS
Bryce Douglas, Phoenixville, Pa., and Jerry A. Weisbach, Cherry Hill, N.J., assignors to Smith Kline & French Laboratories, Philadelphia, Pa., a corporation of Pennsylvania
No Drawing. Filed Apr. 18, 1967, Ser. No. 631,620
Int. Cl. C07d 29/38
U.S. Cl. 260—295.5                              1 Claim

ABSTRACT OF THE DISCLOSURE

An isomer of 3 - acetyl - 3 - carbomethoxy-2-carbomethoxymethyl - 1,2,3,4,6,7 - hexahydro - 12H-indolo[2,3-a] quinolizinium perchlorate having analgesic, antitussive and antidiarrheal activity is prepared from the corresponding isomer of 3-acetyl-3-carbomethoxy-2-carbomethoxymethyl - 1,2,3,4,6,7,12,12b - octahydroindolo[2,3-b] quinolizine by oxidizing with mercuric acetate in dilute acetic acid.

---

This invention relates to new isomers of indolo-[2,3-a] quinolizine compounds, in particular to an isomer of 3-acetyl - 3 - carbomethoxy - 2-carbomethoxymethyl-1,2,3,4, 6,7 - hexahydro - 12H-indolo[2,3-a]quinolizinium perchlorate and to an isomer of 3-acetyl-3-carbomethoxy-2-carbomethoxymethyl - 1,2,3,4,6,7,12,12b - octahydroindolo[2, 3-a]quinolizine.

The octahydroindolo[2,3-a]quinolizine isomer of this invention is an intermediate for preparing the corresponding isomer of quinolizinium salts, including the isomer of 3 - acetyl - 3-carbomethoxy-2-carbomethoxymethyl-1,2,3, 4.6.7-hexahydro-12H-indolo[2,3-a]quinolizinium perchlorate of this invention, which have analgesic, antitussive and antidiarrheal activity.

The isomer of hexahydroindolo[2,3-a]quinolizinium perchlorate and the isomer of octahydroindolo[2,3-a] quinolizine which are the compounds of this invention are represented by the following Formulas I and II, respectively.

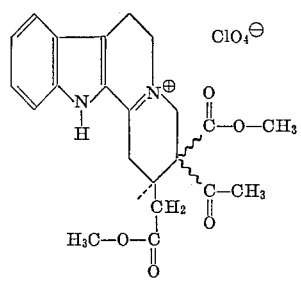

Formula I

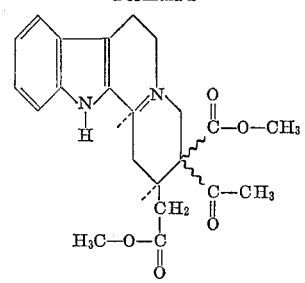

Formula II

In the above formulas and in the formulas presented hereinbelow the bonds by which the acetyl and carbomethoxy substituents are attached to the ring at the 3-position are indicated as ≀ because the stereochemical configuration of these substituents is not known at present. The claimed isomers of Formulas I and II above (which are designated herein as isomers A) are therefore characterized by physical properties.

The claimed isomer (isomer A) of 3-acetyl-3-carbomethoxy - 2 - carbomethoxymethyl-1,2,3,4,6,7-hexahydro-12H-indolo[2,3-a]quinolizinium perchlorate melts at 233–235° C. (dec.). The X-ray diffraction data obtained from this compound is as follows.

| $d$ (Interplanar spacings in angstrom units): | $I/I_1$ (relative intensity incident to diffracted rays) |
|---|---|
| 13.00 | 35 |
| 10.30 | 45 |
| 8.00 | 20 |
| 7.50 | 45 |
| 7.00 | 20 |
| 6.00 | 45 |
| 5.00 | 100 |
| 4.70 | 40 |
| 4.50 | 45 |
| 4.30 | 20 |
| 4.15 | 95 |
| 3.90 | 35 |
| 3.70 | 50 |
| 3.40 | 75 |
| 3.25 | 40 |
| 3.19 | 15 |
| 3.05 | 45 |
| 2.95 | 45 |
| 2.85 | 20 |
| 2.75 | 15 |
| 2.67 | 20 |
| 2.46 | 25 |
| 2.31 | 20 |
| 2.26 | 20 |
| 2.12 | 20 |
| 2.07 | 15 |
| 1.94 | 10 |
| 1.84 | 15 |

The isomer (isomer A) of 3-acetyl-3-carbomethoxy-2-carbomethoxymethyl - 1,2,3,4,6,7,12,12b-octahydroindolo [2,3-a]quinolizine of this invention melts at 206–208° C. and has an Rca value of 1.39±0.05, where Rca is defined as the ratio of the distance of movement of the thin layer spot of the compound to the distance of movement of 2-chloroacridone on a silica gel G(1) thin layer plate using a chloroform-ethyl acetate eluent at room temperature under standard conditions. The X-ray diffraction data obtained from this compound is as follows.

| $d$ (Interplanar spacings in angstrom units): | $I/I_1$ (relative intensity incident to diffracted rays) |
|---|---|
| 11.60 | 50 |
| 10.60 | 30 |
| 8.30 | 50 |
| 6.30 | 95 |
| 5.70 | 98 |
| 5.30 | 30 |
| 4.65 | 100 |
| 4.40 | 88 |
| 3.93 | 40 |
| 3.80 | 50 |
| 3.65 | 55 |
| 3.52 | 35 |
| 3.40 | 35 |
| 3.29 | 30 |
| 3.26 | 70 |
| 3.11 | 20 |
| 2.98 | 35 |

| $d$ (Interplanar spacings in angstrom units): | $I/I_1$ (relative intensity incident to diffracted rays) |
|---|---|
| 2.81 | 40 |
| 2.75 | 5 |
| 2.63 | 10 |
| 2.35 | 25 |
| 2.24 | 25 |
| 2.17 | 15 |
| 2.03 | 10 |
| 1.79 | 5 |

The isomer A of the quinolizinium perchlorate of this invention is more potent as a pharmacological agent, in particular as an analgesic agent and as an antidiarrheal agent, than the corresponding isomer B. In the D'Amour-Smith test in rats for analgesia the isomer A of the quinolizinium perchlorate of this invention has an $ED_{50}$ of 0.66 mg./kg. (base) and the corresponding isomer B has an $ED_{50}$ of 14 mg./kg. (base).

Isomer A of 3-acetyl-3-carbomethoxy-2-carbomethoxymethyl-1,2,3,4,6,7,12,12b-octahydroindolo[2,3 - a]quinolizine is separated from the mixture of isomers by reacting the mixture with lithium aluminum tri-t-butoxy hydride or sodium borohydride in a solvent such as tetrahydrofuan or ethyl ether until, as shown by monitoring the reaction by thin layer chromatography, substantially all of the more polar isomer is reduced and the less polar isomer remains unreduced. The resulting materials are separated by fractional crystallization and chromatography. The unreduced isomer is the isomer A of 3-acetyl-3-carbomethoxy-2-carbomethoxymethyl - 1,2,3,4,6,7,12,12b-octahydroindolo[2,3-a]quinolizine of this invention.

This octahydroindolo[2,3-a]quinolizine isomer is used to prepare the corresponding isomers of quinolizinium salts, including the perchlorate salt of this invention, as follows:

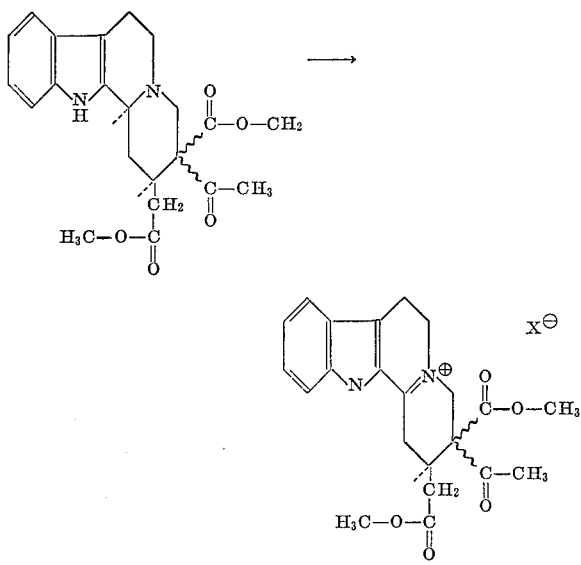

in which X is a pharmaceutically acceptable anion such as perchlorate, halide, in particular, chloride, sulfate or nitrate. The isomer of the octahydroindolo[2,3-a]quinolizine is oxidized with mercuric acetate in dilute acetic acid. Conveniently, the product is isolated as the quinolizinium perchlorate salt which may then be converted to other salts by dissolving in an appropriate solvent such as a lower alkanol, for example, methanol, and passing the solution through an ion exchange resin or by double decomposition with an appropriate salt.

The following examples illustrate the preparation of the isomers of this invention.

EXAMPLE 1

Eight grams of 3-acetyl-3-carbomethoxy-2-carbomethoxymethyl-1,2,3,4,6,7,12,12b - octahydroindolo[2,3-a]-quinolizine is dissolved in 80 ml. of tetrahydrofuran which has been redestilled over lithium aluminum hydride. A solution of 5.072 g. of lithium aluminum tri-t-butoxy hydride in 160 ml. of tetrahydrofuran is added dropwise with vigorous stirring over a period of one hour, under nitrogen, keeping the reaction mixture at —15° to —10° C. Thin layer chromatography using a silica plate and 10% ethyl acetate-90% chloroform developing system is used to monitor the course of the reaction. The reaction is stopped by adding water and then acetic acid when it appears that almost all of the more polar isomer B is reduced and the less polar (higher R$f$) isomer A is unreduced. The tetrahydrofuran is evaporated off, in vacuo, and the residue extracted with 10% sulfuric acid. The aqueous acid extracts are made alkaline with ammonium hydroxide and extracted with chloroform. The chloroform extract is washed with saturated sodium chloride and dried over sodium sulfate. The chloroform is evaporated off in vacuo and benzene is added to the residue. The mixture is filtered and the benzene is removed from the filtrate. Methanol is added to the residue. Cooling and filtering gives isomer A of 3-acetyl-3-carbomethoxy-2-carbomethoxymethyl - 1,2,3,4,6,7,12,12b-octahydroindolo[2,3-a]quinolizine. Additional isomer A of this octahydroindolo[2,3-a]quinolizine compound is obtained by removing the methanol from the filtrate in vacuo and chromatographing the residue on "Florisil" using benzene as solvent. After recrystallizing from methanol, isomer A of 3-acetyl-3-carbomethoxymethyl - 1,2,3,4,6,7,12,12b-octahydroindolo[2,3-a]quinolizine melts at 206–208° C. and has an R$ca$ value of 1.39±0.05, where R$ca$ is defined as the ratio of the distance of movement of the thin layer spot of the compound to the distance of movement of 2-chloroacridone on a silica gel G(1) thin layer plate using a chloroform-ethyl acetate eluant at room temperature under standard conditions.

The above prepared indoloquinolizine compound is treated with methanolic hydrogen chloride to give, after filtering and recrystallizing from methanol-ethyl acetate, 3-acetyl-3-carbomethoxy-2-carbomethoxymethyl - 1,2,3,4, 6,7,12,12b-octahydroindolo[2,3-a]quinolizine hydrochloride (isomer A), M.P. 189.5–191° C.

EXAMPLE 2

Isomer A of 3-acetyl-3-carbomethoxy-2-carbomethoxymethyl-1,2,3,4,6,7,12,12b - octahydroindolo[2,3-a]quinolizine (prepared as in Example 1) is added to a solution of 3.3 g. of mercuric acetate in 50 ml. of 5% acetic acid. The resulting mixture is heated under nitrogen for 75 minutes on a steam bath, then filtered. Kieselguhr is added to the filtrate and hydrogen sulfide is bubbled through the mixture. The mixture is heated on a steam bath for one hour, then cooled and filtered. Six grams of sodium perchlorate in water is added to the filtrate. The precipitate is separated by filtration and then dissolved in methanol. The methanol solution is treated with charcoal. Ethyl acetate is added and the precipitate is filtered off to give isomer A of 3-acetyl-3-carbomethoxy-2-carbomethoxymethyl - 1,2,3,4,6,7-hexahydro - 12H-indolo[2,3-a]quinolizinium perchlorate which, after recrystallizing from methanol-ethyl acetate melts at 233–235° C. (dec.).

A sample of the above prepared perchlorate salt in methanol is passed through a chloride ion exchange resin to give isomer A of 3-acetyl-3-carbomethoxy-2-carbomethoxymethyl-1,2,3,4,6,7 - hexahydro-12H - indolo[2,3-a] quinolizinium chloride. Similarly, using a sulfate ion exchange resin the sulfate salt is obtained.

What is claimed is:
1. An isomer of the formula:
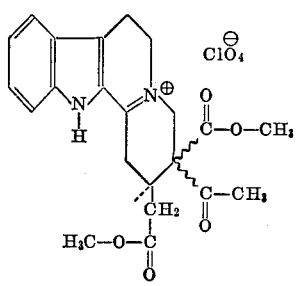
being characterized by: a melting point of 233–235° C. (dec.); X-ray diffraction data as follows:
| $d$ (Angstrom units)— | $I/I_1$ (relative intensity) |
|---|---|
| 13.00 | 35 |
| 10.30 | 45 |
| 8.00 | 20 |
| 7.50 | 45 |
| 7.00 | 20 |
| 6.00 | 45 |
| 5.00 | 100 |
| 4.70 | 40 |
| 4.50 | 45 |
| 4.30 | 20 |
| 4.15 | 95 |
| 3.90 | 35 |
| 3.70 | 50 |
| 3.40 | 75 |
| 3.25 | 40 |
| 3.19 | 15 |
| 3.05 | 45 |
| 2.95 | 45 |
| 2.85 | 20 |
| 2.75 | 15 |
| 2.67 | 20 |
| 2.46 | 25 |
| 2.31 | 20 |
| 2.26 | 20 |
| 2.12 | 20 |
| 2.07 | 15 |
| 1.94 | 10 |
| 1.84 | 15 |
References Cited
Van Tamelen and Placeway: J. Am. Chem. Soc., vol. 83, pp. 2594–5 (1961).
HENRY R. JILES, Primary Examiner
G. T. TODD, Assistant Examiner
U.S. Cl. X.R.
260—294.3, 999